United States Patent
Peake et al.

(10) Patent No.: US 8,327,106 B2
(45) Date of Patent: Dec. 4, 2012

(54) SELECTIVE DEVICE ACCESS CONTROL

(75) Inventors: Jonathan W. Peake, Tucson, AZ (US);
Joseph M. Swingler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 530 days.

(21) Appl. No.: 12/619,458

(22) Filed: Nov. 16, 2009

(65) Prior Publication Data

US 2011/0119441 A1 May 19, 2011

(51) Int. Cl.
*G06F 12/00* (2006.01)
(52) U.S. Cl. ............. 711/170; 711/4; 711/114; 711/156
(58) Field of Classification Search .................. None
See application file for complete search history.

(56) References Cited

U.S. PATENT DOCUMENTS

| | | | |
|---|---|---|---|
| 4,480,304 A | 10/1984 | Carr et al. | |
| 5,339,427 A | 8/1994 | Elko et al. | |
| 5,678,023 A | 10/1997 | Adams et al. | |
| 6,633,962 B1 | 10/2003 | Burton et al. | |
| 6,763,458 B1 | 7/2004 | Watanabe et al. | |
| 8,032,712 B2 * | 10/2011 | Murayama et al. | 711/137 |
| 2006/0224852 A1 | 10/2006 | Kottomtharayil et al. | |

FOREIGN PATENT DOCUMENTS

WO 2004/057834 A2 7/2004

OTHER PUBLICATIONS

IBM, "Storage Management Automation," www.ip.com, Nov. 17, 2006, 2 pages.
Johnson et al.., "Method for Performing a Selective Physical Backup of a Shared File System Storage Group," www.ip.com, Oct. 1, 1992, 4 pages.
Lee et al., "Mitigating Soft Error Failures for Multimedia Applications by Selective Data Protection," ACM, 2006, pp. 411-420.
Sivanthanu et al., "Type-Safe Disks," USENIX Association, 2006, pp. 15-28.
International Search Report for counterpart application No. PCT/EP2010/066840, mailed Feb. 9, 2011.
Schlumberger, "DFSMSrmm Primer," XP007916950, http://www.redbooks.ibm.com/redbooks/pdfs/sg245983.pdf, Jun. 1, 2005, 23 pages.

* cited by examiner

*Primary Examiner* — Shawn X Gu
(74) *Attorney, Agent, or Firm* — Griffiths & Seaton PLLC (57) ABSTRACT

Various method, system, and computer program product embodiments for selective device access control in a data storage system are provided. In one such embodiment, a plurality of access groups associated with logical devices used to access the data storage system is initialized. Each of the plurality of access groups corresponds to a range of the logical devices. An access group name of one of the access groups is bound to a logical volume of the data storage system at a volume creation. The logical volume, once bound to the access group name, is granted access by those of the logical devices in a range of the logical devices corresponding to the one of the access groups.

19 Claims, 4 Drawing Sheets

SELECTIVE DEVICE ACCESS CONTROL

BACKGROUND OF THE INVENTION

1. Field of the Invention

The present invention relates in general to computers, and more particularly to apparatus, method and computer program product embodiments for implementing selective device access control mechanisms in a computing storage environment.

2. Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user. These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units.

Data storage capacities of various media have grown substantially with time, such that a single data storage media is capable of storing many times that of earlier media. One way of handling the data is to have the present media store multiple "logical" units of data that once were the entire capacity of the media. The concept of "logical" units of data is further carried out in the handling of the data in hierarchical data storage servers, where frequently accessed data is stored in faster but expensive memory, and less frequently accessed data is stored in high capacity but slower memory. One example of a fast memory is a direct access storage device (DASD) comprising a disk drive, or a solid state disk (SSD). Examples of high capacity memory are magnetic tape drives or libraries, and disk drive arrays, such as RAID (redundant array of independent disks), or JBOD (just a bunch of disks). Typically, a number of the logical units of data, such as logical volumes, are stored together in the faster memory, and very large numbers of logical units of data are stored together in the slower memory. The logical units of data are typically identified by volume serial numbers (VOLSERs), and may be treated as though they were being stored as "virtual" single data storage media or objects in a "virtual" data storage drive or library, whereas they are actually stored together in files or stacked in physical media.

SUMMARY OF THE INVENTION

Data storage host sysplex configurations, through a mistake in a particular host sysplex's catalog, may be exposed to logical volumes outside of their own management. This may lead to the volume being used by two independent sysplexes, which may, in turn, lead to data loss. As a result, a need exists for a mechanism allowing for more effective enforcement of sysplex volume partitioning, and prevention of any one non-parallel sysplex from modifying, accessing, or deleting data in which the sysplex does not own.

In view of the foregoing, various method, system, and computer program product embodiments for implementing mechanisms for selective device access control in a data storage system are provided. In one such embodiment, by way of example only, a plurality of access groups associated with logical devices used to access the data storage system is initialized. Each of the plurality of access groups corresponds to a range of the logical devices. An access group name of one of the access groups is bound to a logical volume of the data storage system at a volume creation. The logical volume, once bound to the access group name, is granted access by those of the logical devices in a range of the logical devices corresponding to the one of the access groups.

In addition to the foregoing exemplary embodiment, various other method, system, and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
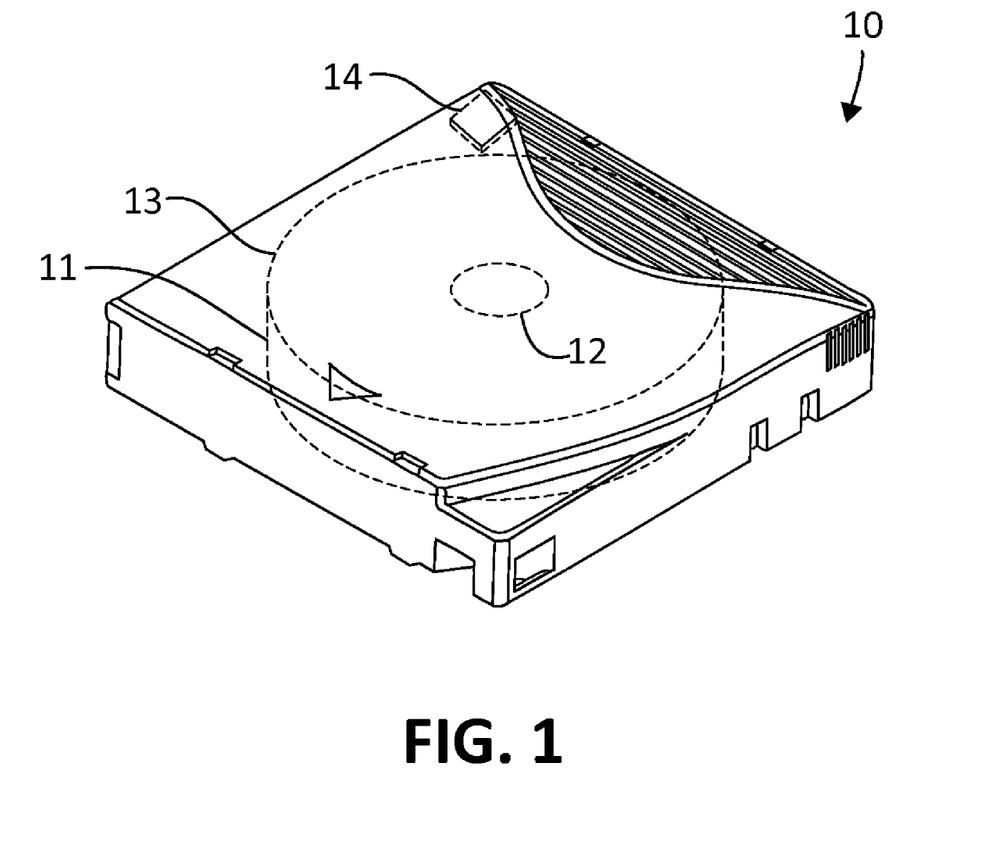
FIG. 1 is an isometric view of a removable data storage cartridge with a media, such as magnetic tape, and with a cartridge memory shown in phantom.

Referring to FIG. 1, an example of a data storage cartridge 10, such as a magnetic tape cartridge, is illustrated which comprises a rewritable magnetic tape 11 wound on a hub 12 of reel 13, and a cartridge memory 14. One example of a magnetic tape cartridge comprises a cartridge based on LTO (Linear Tape Open) technology. The cartridge memory (CM) 14, for example, comprises a transponder having a contactless interface, which is retained in the cartridge 10, for example, by being encapsulated by the cartridge when it is assembled, as is understood by those of ordinary skill in the art. The illustrated magnetic tape cartridge is a single reel cartridge. Magnetic tape cartridges may also comprise dual reel cartridges in which the tape is fed between reels of the cartridge. The magnetic tape 11 is typically arranged to store a large number of volumes of data.

Data is not always stored on a physical media 11 whose replacement in a physical cartridge 10 can be detected. Rather, data storage systems may store data in different forms, such as logical or virtual data, and an example of such a system is illustrated in the data storage system 20 of FIG. 2. Herein, data may be organized in any of various forms, called "volumes" or "objects", the terms chosen without reference to any particular size or arrangement of data.

Figure 2:
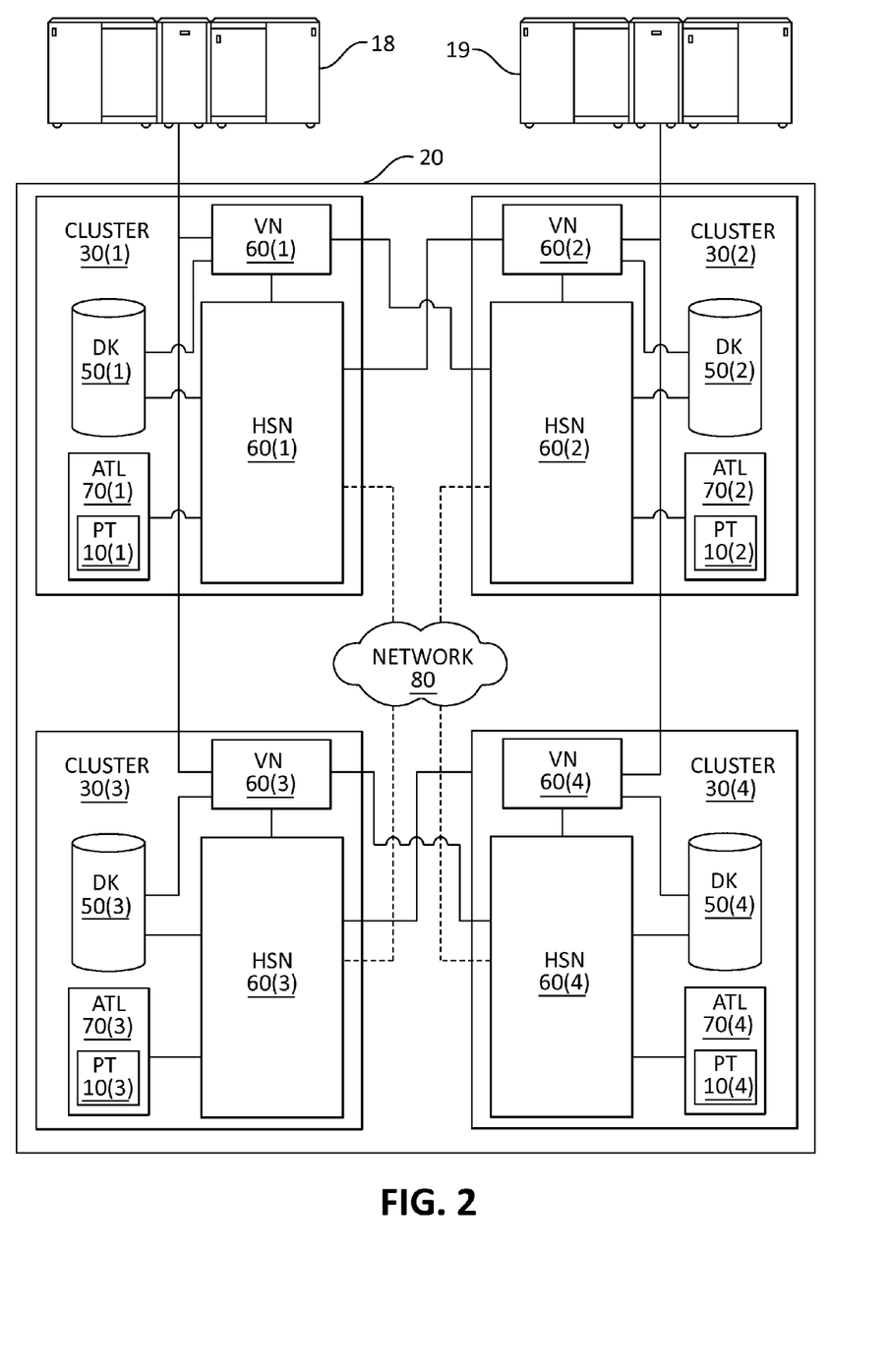
FIG. 2 is a diagrammatic illustration of a data storage system which may implement the present invention.
Figure 3:
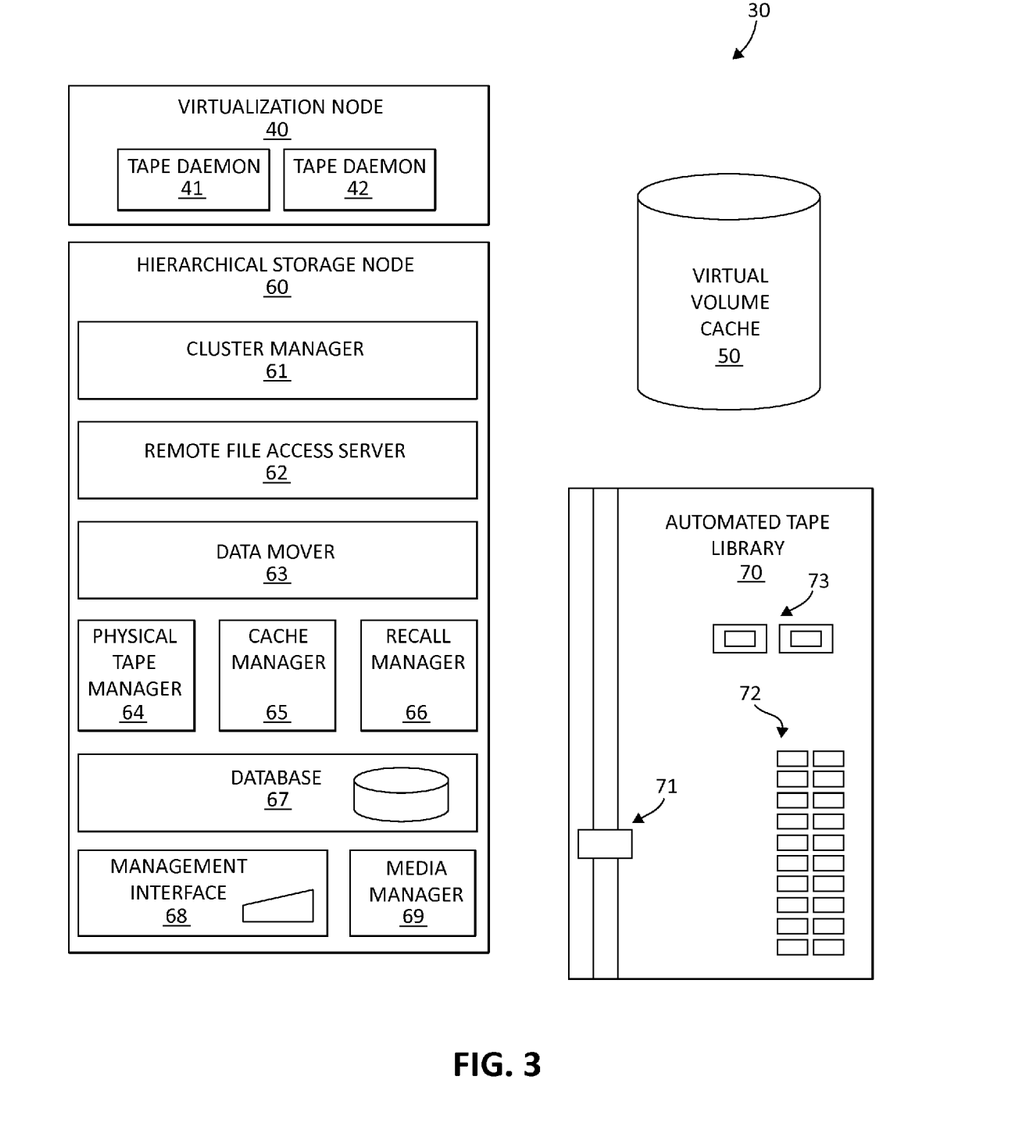
FIG. 3 is a diagrammatic illustration of a server of the data storage system of FIG. 2.

Referring to FIGS. 2 and 3, the data storage system 20 provides storage for a plurality of host systems 18, 19. The data storage system 20, in one embodiment, employs four (4) virtual tape server clusters 30 interconnected by a network 80 with each cluster 30 including a virtualization node ("VN") 40 and a disk storage ("DK") 50 for emulating a tape drive or tape library to hosts 18, 19. Each cluster further comprises a hierarchical storage node ("HSN") 60 for locally moving data between disk storage 50 and an automated tape library ("ATL") 70 as well as remotely moving data between a local disk storage 50 and a remote disk storage. Examples of disk storage comprise one or more disk drives, for example, arranged as a redundant array of independent disks (RAID) or just a bunch of disks (JBOD), or solid state disk (SSD), etc. Herein, a data storage system having both disk storage 50 and an automated tape library 70 is called a "composite library."

In one embodiment, disk storage 50 serves as a virtual volume cache containing logical volumes that emulate data volumes that would be stored on magnetic tape 11 of FIG. 1. Still referring to FIGS. 2 and 3, the logical volumes are stored by disk storage 50 for local and remote access thereto, and library 70 comprises at least one robotic accessor 71 for mounting physical tape cartridges 72 in physical tape drives 73 for access to volumes stored in the physical tape cartridges 72. To this end, virtualization node 40 employs a pair of tape daemons 41 and 42 for operating on virtual volume files residing in either local cache disk storage 50 or a remote cache disk storage as directed by a host system 18, 19, and hierarchical storage node 60 employs a cluster manager 61, a remote file access server 62, a data mover 63, a physical tape manager 64, a cache manager 65, a recall manager 66, a database 67, a management interface 68 and a media manager 69.

Cluster manager 61 coordinates operations between clusters 30 via intercluster tokens that a stored in each cluster's database 67 to determine which cluster 30 has a current copy of data and coordinates copying of data between clusters. Remote file access server 62 provides a link to cache disk storage 50 by a remote cluster. Data mover 63 controls the actual data transfer operations for copies performed between clusters 30 and transfers of data between cache disk storage 50 and library 70.

Physical tape manager 64 manages physical tape volumes in library 70 in multiple physical volume pools, controls reclamation, borrows/returns volumes from a scratch pool, and controls movement of physical tape cartridges 72 and the volumes between pools. Cache manager 65 controls a copying of data volumes between cache disk storage 50 to library 70 and any subsequent removal of a redundant copy of data in cache 50, and provides control signals to balance data flow between cache disk storage 50 and other node 60 components. Recall manager 66 queues and controls recalls of data into cache data storage 50 from library 70 on behalf of virtualization node 40 and cluster manager 61.

Management interface 68 provides information about virtual tape server cluster 30 and may allow a user control and configuration of cluster 30. Media manager 69 manages the handling of physical tape cartridges 72 and error recovery, and diagnoses errors and determines if the errors were caused by a physical tape drive 73 of library 70 or a physical tape media 11 to thereby take appropriate action. An example of a data storage system 20 which may implement the present invention comprises the IBM® TS7700 Virtual Tape Server.

In the IBM® TS7700 Virtual Tape Server environment previously described, a user may share a grid solution among completely independent host groups and/or partitions. These independent, non-parallel sysplex host configurations have no shared knowledge with respect to what volumes are being managed by outside non-parallel sysplexes. In other words, only those volumes managed by a given sysplex or parallel sysplex are "known" to exist, even though thousands, if not millions, of additional volumes are accessible through the TS7700 and are simply not made visible to all sysplexes.

This visibility is controlled through host catalogues where explicit volume ranges configured by the user. Therefore, so long as no two independent sysplexes overlap with volume ranges, there should be no inadvertent access/modification of volumes outside of a sysplex's knowledge. To help with scratch pools, or pools of storage units from which one may be acquired and mounted/used, each independent sysplex is also required to define its own scratch pools/categories to prevent the TS7700 from surfacing one sysplex's volumes to another.

Though the manually configured volume ranges and independent scratch pools provide adequate partitioning of independent sysplex data, as previously indicated, a mistake in a sysplex's catalog may expose it to volumes outside of its management. This scenario may lead to the volume being used by two independent sysplexes. In many cases, this mistake may later be realized in which the definitions are removed from the non-parallel sysplex. At this time, a deletion/eject is often carried out through eject processing since the non-parallel sysplex does not realize other sysplexes are still configured to use the volumes. An eject or deletion in this case may be catastrophic to the owning sysplex. In addition, malicious behavior within the catalogue configuration may allow one sysplex with perhaps less protection to eject/modify data of another sysplex.

To address these potential issues, among others, the illustrated embodiments below provide mechanisms for facilitating selective write protect in a computing storage environment. In one exemplary embodiment, these mechanisms pertain to providing "hard partitioning" functionality through a mechanism referred to herein as "selective device access control," which enforces the protection of independent sysplex data through access groups associated with the logical devices used to access the storage system.

In a shared TS7700 storage environment, for example, each independent group of sysplexes tend to vary on specific logical device ranges within a TS7700 Grid composite library. In addition, through the use of Automatic Class Selection (ACS) routines within z/OS® software, all volume scratch mounts can provide unique constructs that help educate the TS7700 on how the system should operate with respect to a requested mount. Accordingly, features inherent to storage systems such as the TS7700 environment, such as those described above, may assist in facilitating various aspects of the present invention.

In one embodiment of the present invention, a user, by virtue of the management interface previously described, is able to configure a number of access groups, or multiple-character names (such as eight character names). Configuration and use of such access groups is further described in detail, following. Each configured access group includes corresponding ranges of storage devices (logical or otherwise) associated with a particular access group. In embodiments featuring ACS routines, a management class definition (one of the unique construct names previously indicated) is, through indirection, assigned an access group name by the user through the management interface. When a mount of a logical volume occurs, the ACS routines will allow the mount request to have an associated management class construct name provided with the mount.

Following the mount previously described, the storage system will then read the management class definition corresponding to the mount-provided management class. If a match is found, the management class' access group definition will be determined. If an access group is found, its access group name is then bound to the logical volume at first write (pursuant to volume creation). Once bound, the volume is now associated with the bound access group and only devices configured within the access group can access, read, update, delete and modify a volumes data and/or properties. Even the process of returning a volume to scratch will not unbind the access group, and therefore independent sysplex scratch pools must be alternatively used. Only if the background delete expire processing routine automatically deletes the volume will the access group name be unbound, in which another sysplex may then utilize the volume.

In one exemplary embodiment, the access group name is bound within the metadata associated with the volume, and is therefore retained through volume movement out of cache to back end tape as well as replication to other clusters. In addition, the particular access group bound to the volume will be retained through export/imports, as well as disaster recoveries where volume data is salvaged from back end stacked tapes. To help account for changes in a host environment, the device ranges associated with an access group may be changed at any time, assuming the customer has access rights to the management interface panel that surfaces the access group properties.

Although, in the exemplary embodiment described above, the device ranges associated with an access group may be changed, the name itself cannot be altered until the volume is either delete-expired or is re-used (write from BOT) by a sysplex in the privileged group and the ACS routine provides a different management class name, or the management class name provided or already bound has a new associated group name associated. In this scenario, reuse may then be obtained.

In one embodiment featuring the TS7700 system previously described, ranges for the logical devices may be defined by LIBRARY PORT-IDs. Alternatively the ranges may be defined by subsystem groups of a number of predefined devices (e.g., 16). In other words, host connectivity may be realized on a per logical control unit granularity, which gives it access to the predefined number of logical devices per control unit. Each control unit (again, e.g., 16 devices) may contain a grid-unique LIBRARY PORT-ID associated with it. These LIBRARY-PORT IDs may then be used to define an access group name.

Continuing the exemplary embodiment described above, each access group name may be a record in a DB2 database. The record may contain a multiple character name (e.g., eight characters), a description and a comma delimited text field used to define library port id ranges. For example, "0x01, 0x03, 0x05-0x07" may be defined where 0x05, 0x06 and 0x07 are implied by the '-' range token. These access group name definitions are stored within a database that is synchronized among all clusters in a TS7700 Grid configuration, for example.

As a result of the foregoing example, including use of eight-character name definitions, each cluster in a particular TS7700 then has a corresponding management class definition database that contains up to 255 defined management class definitions. Each definition contains an eight-character name as well as rules/properties associated with the definition. One new rule may be the 'Access Group' associated with the management class. The user may be required to choose an access group for each management class. A NULL entry represents no access group in which no enforcement/binding will occur.

When a mount occurs where a write from beginning of tape (BOT) is anticipated/required, the currently assigned management class (which is likely provided with the mount request itself) may be used to lookup a management class record within the mounting cluster's management class table. The matching record may then be used to determine how to manage the volume that is being created/re-used. If the management class entry has an access group defined, the eight-character name is then bound into the volume header (on disk) as well as into the TS7700 token volume database. If no access group name is defined within the management class, no access group is bound, and if one previously exists against the volume, it is cleared.

When a volume has a bound access group defined to it, all accesses, including private mounts, scratch mounts, mounts with intent to re-use or rewrite from BOT, volume property commands such as category change or attribute changes, Bulk Volume Information Requests (BVIR), and Copy Export List Volumes will be failed if the currently bound access group does not contain the device's subsystem identification (such as library port id) associated with the device used to issue the command. When re-binding takes place, the new access group being bound must also contain the identification (again, such as the library port id) associated with the device used to issue the mount. This is in addition to the existing access group (if any) previously bound to the volume being re-used.

When a volume that has a bound access group name is moved to scratch via a device that is in the access group definition, the volume may incur delete-expire processing run against it. Delete expire processing is a mechanism to free up volume space associated with scratch volumes a predefined period of time (e.g., N hours) after the volume is moved to scratch. Once delete expire processing is run against a volume its associated data has been deleted, the access group binding is no longer necessary and the volume can be re-used by any sysplex.

Figure 4:
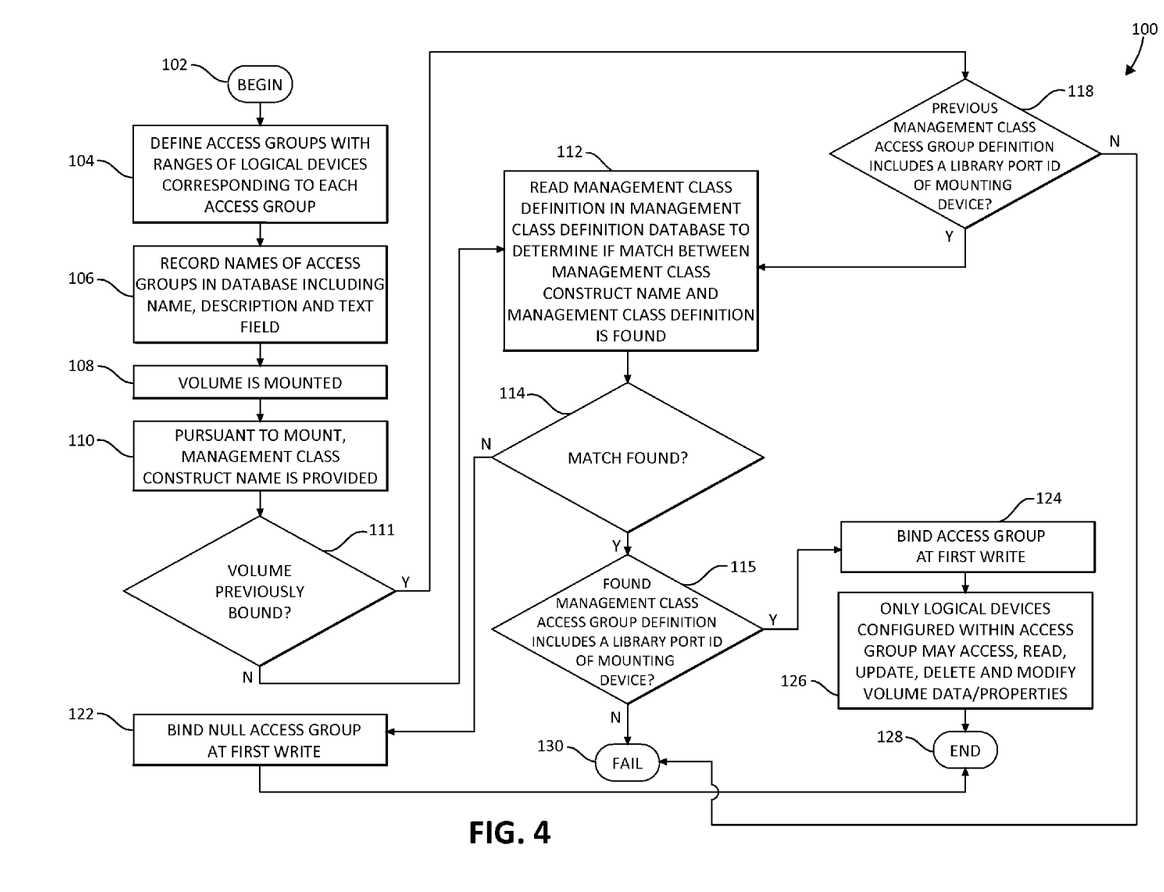
FIG. 4 is a flow chart diagram of an exemplary method for implementing a mechanism for selective device access control in a data storage system.

Turning now to FIG. 4, a flow-chart diagram of a method 100 for implementing selective device access control in a computer data storage system, such as that previously described, is depicted. As one of ordinary skill in the art will appreciate, various steps in the method 100 may be implemented in differing ways to suit a particular application. In addition, the described method may be implemented by various means, such as hardware, software, firmware, or a combination thereof operational on or otherwise associated with the computing storage environment. For example, the method 100 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 100 begins (step 102) by defining a number of access groups, each access groups associated with a range of corresponding logical devices (step 104). As part of the definition process, the user may be required to choose an access group for each management class, as previously indicated. The names of the access groups are recorded in a database (step 106), for example including name, description and comma delimited text field used to define LIBRARY PORT ID ranges.

Subsequent to the definition of the various access groups, a logical volume is mounted (step 108). In one example, the logical volume may be taken from a scratch pool as previously described. Pursuant to the mount, the system provides a management class construct name again as previously described (step 110). The method 100 then queries if the logical volume was previously bound (step 111). If so, then the method queries whether the previous management class access group definition associated with the previously bound access group name contains a LIBRARY PORT ID of the mounting device (step 118). If this is the case, then the method 100 moves to step 112, as will be described below.

Returning to step 111, if the volume is not previously bound, the management class definition database is examined to read an associated management class definition to determine if a match between the mount-provided management class construct name and the management class definition provided by the user is found (step 112). If a match is not found (step 114), the method 100 then moves to step 122, where the null access group is bound to the volume at a first write of the volume This binding process is further described, following. The method 100 then ends (again, step 128).

Returning to step 114, if the mounting management class points to a configured access group, and the LIBRARY PORT ID of the mounting device is located in the access group (step 115), then the method 100 moves to step 124, where once a first write operation to the volume occurs, the access group name is bound to the volume. While in the illustrated embodiment the binding operations described occur pursuant to the first write, other triggers associated with volume creation may cause the binding operations to occur as one of ordinary skill in the art will appreciate. Accordingly for purposes of the following claimed subject matter, such events are collectively referred to as volume creation. As a result of the binding operation, only logical devices configured within the bound access group may access, read, update, delete and modify data and/or properties of the logical volume (step 126). The method then ends (again, step 128).

Returning to steps 118 and 115, if the previous management class access group definition, or the found management class access group definition does not include a LIBRARY PORT ID of the mounting device, the method 100 fails the mount of the volume (step 130).

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for selective device access control in a data storage system, comprising:

initializing a plurality of access groups associated with logical devices used to access the data storage system, each of the plurality of access groups corresponding to a range of the logical devices;

binding an access group name of one of the plurality of access groups to a logical volume of the data storage system at a volume creation, wherein the logical volume, once bound to the access group name, is accessible by logical devices in a range of the logical devices corresponding to the one of the plurality of access groups;

pursuant to a mount of the logical volume, providing a management class construct name associated with a mount request for the logical volume;

reading a management class definition in a management class definition database, the management class definition corresponding to the management class construct name to determine if a match is found; and determining a management class access group definition containing the access group name.

2. The method of claim 1, wherein if the logical volume is previously bound to another access group name, determining whether another management class access group definition associated with the another access group name includes a mounting device of corresponding logical devices as a prerequisite to replacing the another access group name with the access group name.

3. The method of claim 1, wherein if the match is not found, not binding the access group name to the logical volume, and further wherein if another access group name is previously bound to the logical volume and a mounting device of corresponding logical devices is included in another management class access group definition associated with the another access group name, clearing the another access group name.

4. The method of claim 1, further including defining a range of the logical devices in a management class access group using unique library port identification values (IDs).

5. The method of claim 4, wherein defining the range of the logical devices in the management class access group includes implementing a multiple character name field, a description field, and a comma delimited text field used to define a library port ID range.

6. The method of claim 1, further including granting the access to the logical volume by those of the logical devices in the range of the logical devices corresponding to the one of the plurality of access groups to perform at least one of a private mount operation, a scratch mount operation, a mount with intent to reuse or rewrite from beginning of tape (BOT), and a volume property operation pursuant to a volume property command.

7. A system for selective device access control in a data storage system, comprising:

logical devices;

a processing device configured to be operable with the logical devices; and a memory configured to be operable with the processing device, the memory including:

a management module operable with the processing device on the data storage system, wherein the management module is adapted for:

initializing a plurality of access groups associated with the logical devices used to access the data storage system, each of the plurality of access groups corresponding to a range of the logical devices, binding an access group name of one of the plurality of access groups to a logical volume of the data storage system at a volume creation, wherein the logical volume, once bound to the access group name, is accessible by logical devices in a range of the logical devices corresponding to the one of the plurality of access groups, pursuant to a mount of the logical volume, providing a management class construct name associated with a mount request for the logical volume, reading a management class definition in a management class definition database, the management class definition corresponding management class construct name to determine if a match is found, and determining a management class access group definition containing the access group name.

8. The system of claim 7, wherein the management module is further adapted for, if the logical volume is previously bound to another access group name, determining whether another management class access group definition associated with the another access group name includes a mounting device of corresponding logical devices as a prerequisite to replacing the another access group name with the access group name.

9. The system of claim 7, wherein the management module is further adapted for, if the match is not found, not binding the access group name to the logical volume, and further wherein if another access group name is previously bound to the logical volume and a mounting device of corresponding logical devices is included in another management class access group definition associated with the another access group name, clearing the another access group name.

10. The system of claim 7, wherein the management module is further adapted for defining a range of logical devices in a management class access group using unique library port identifications (IDs).

11. The system of claim 10, wherein the management module is further adapted for, pursuant to defining the logical devices in the management class access group, implementing a multiple character name field, a description field, and a comma delimited text field used to define a library port ID range.

12. The system of claim 11, wherein the library port ID range accounts for corresponding logical devices within any of a plurality of interconnected storage nodes having visibility to the logical volume.

13. The system of claim 7, wherein the management module is further adapted for granting the access to the logical volume by those of the logical devices in the range of the logical devices corresponding to the one of the plurality of access groups to perform at least one of a private mount operation, a scratch mount operation, a mount with intent to reuse or rewrite from beginning of tape (BOT), and a volume property operation pursuant to a volume property command.

14. The system of claim 7, wherein the management module is further adapted for providing a management interface to a user to configure at least one of the plurality of access groups and the access group name.

15. The system of claim 7, further including a database associated with the management module for storing the access group name.

16. The system of claim 7, wherein the data storage system includes at least one virtual tape server.

17. A computer program product for selective device access control in a data storage system, the computer program product comprising a computer-readable storage medium having computer-readable program code portions stored therein, the computer-readable program code portions comprising:

- a first executable portion for initializing a plurality of access groups associated with logical devices used to access the data storage system, each of the plurality of access groups corresponding to a range of the logical devices;
- a second executable portion for binding an access group name of one of the plurality of access groups to a logical volume of the data storage system at a volume creation, wherein the logical volume, once bound to the access group name, is accessible by corresponding logical devices in a range of the logical devices corresponding to the one of the plurality of access groups;
- a third executable portion for, pursuant to a mount of the logical volume, providing a management class construct name associated with a mount request for the logical volume; and
- a fourth executable portion for:
    reading a management class definition in a management class definition database, the management class definition corresponding to the management class construct name to determine if a match is found, and
    determining a management class access group definition containing the access group name.

18. The computer program product of claim 17, further including a fifth executable portion for, if the logical volume is previously bound to another access group name, determining whether another management class access group definition associated with the another access group name includes a mounting device of corresponding logical devices as a prerequisite to replacing the another access group name with the access group name.

19. The computer program product of claim 17, further including a fifth executable portion for, if the match is not found, not binding the access group name to the logical volume, and further wherein if another access group name is previously bound to the logical volume and a mounting device of corresponding logical devices is included in another management class access group definition associated with the another access group name, clearing the another access group name.

* * * * *